US010334156B2

(12) United States Patent
Chaney, Jr. et al.

(10) Patent No.: US 10,334,156 B2
(45) Date of Patent: Jun. 25, 2019

(54) SYSTEMS AND METHODS FOR VARYING FIELD OF VIEW OF OUTSIDE REAR VIEW CAMERA

(71) Applicant: GM Global Technology Operations LLC, Detroit, MI (US)

(72) Inventors: Michael T. Chaney, Jr., Royal Oak, MI (US); Allan K. Lewis, Windsor (CA); Mohammad Naserian, Windsor (CA); Valor Yaldo, Farmington Hills, MI (US); Mohannad Murad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 15/366,065

(22) Filed: Dec. 1, 2016

(65) Prior Publication Data

US 2018/0160030 A1 Jun. 7, 2018

(51) Int. Cl.
*H04N 5/232* (2006.01)
*H04N 7/18* (2006.01)
*G06K 9/00* (2006.01)
*B60R 1/12* (2006.01)
*B60R 1/06* (2006.01)
(Continued)

(52) U.S. Cl.
CPC .......... *H04N 5/23216* (2013.01); *B60R 1/00* (2013.01); *B60R 1/06* (2013.01); *B60R 1/12* (2013.01); *G06K 9/00825* (2013.01); *H04N 5/23293* (2013.01); *H04N 5/247* (2013.01); *H04N 7/181* (2013.01); *B60R 2001/1253* (2013.01); *B60R 2300/101* (2013.01); *B60R 2300/70* (2013.01); *B60R 2300/8046* (2013.01);
(Continued)

(58) Field of Classification Search
CPC ..... B60R 1/06; B60R 1/12; B60R 2001/1253; B60R 2300/8046; B60R 2300/8066; G06K 9/00798; G06K 9/00825; H04N 5/23216; H04N 5/23293; H04N 7/181
See application file for complete search history.

(56) References Cited

U.S. PATENT DOCUMENTS

2005/0174429 A1* 8/2005 Yanai ................. B60R 1/00
348/148
2012/0154591 A1* 6/2012 Baur ................. B60R 1/00
348/148
(Continued)

*Primary Examiner* — Francis Geroleo

(57) ABSTRACT

A side rear view camera is located at a driver or passenger side of the vehicle, captures video beside and behind the vehicle, and has a predetermined field of view (FOV). The predetermined FOV is defined by a first predetermined horizontal angle of view (AOV) and a first predetermined vertical AOV. A display is located and visible within a passenger cabin of the vehicle. A display module, on the display: displays a first portion of the video from within a first predetermined portion of the predetermined FOV, the first predetermined portion of the predetermined FOV being defined by a second predetermined horizontal AOV and a second predetermined vertical AOV; and selectively displays a second portion of the video from within a second predetermined portion of the predetermined FOV, the second predetermined portion of the predetermined FOV being defined by a third predetermined horizontal AOV and a third predetermined vertical AOV.

18 Claims, 13 Drawing Sheets

(51) Int. Cl.
 B60R 1/00 (2006.01)
 H04N 5/247 (2006.01)
(52) U.S. Cl.
 CPC .. *B60R 2300/8066* (2013.01); *G06K 9/00798* (2013.01); *G06K 9/00805* (2013.01)

(56) References Cited

U.S. PATENT DOCUMENTS

| | | | |
|---|---|---|---|
| 2016/0243988 A1* | 8/2016 | Peterson | B60R 1/072 |
| 2018/0018939 A1* | 1/2018 | Choi | B60K 35/00 |
| 2018/0134217 A1* | 5/2018 | Peterson | B60R 1/06 |
| 2018/0154831 A1* | 6/2018 | Spencer | B60R 1/00 |

* cited by examiner

SYSTEMS AND METHODS FOR VARYING FIELD OF VIEW OF OUTSIDE REAR VIEW CAMERA

FIELD

The present disclosure relates to outside rear view mirror systems of vehicles and more particularly to systems and methods for adjusting field of view of video obtained using outside rear view mirror cameras.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A driver of a vehicle traditionally views surroundings of a vehicle through windows, wind shields, and other glass of the vehicle. The driver may control vehicle acceleration, deceleration, and steering based on the driver's visual observation of the surroundings of the vehicle.

A vehicle may include one or more side rear view mirrors that allow a driver to see beside and behind the vehicle. Such rear view mirrors include, for example, a driver side rear view mirror that is located near a driver door of the vehicle and a passenger side rear view mirror that is located near a front passenger door of the vehicle.

SUMMARY

In a feature, a side rear view camera system of a vehicle is described. A side rear view camera is located at a driver or passenger side of the vehicle, captures video beside and behind the vehicle, and has a predetermined field of view (FOV). The predetermined FOV is defined by a first predetermined horizontal angle of view (AOV) and a first predetermined vertical AOV. A display is located and visible within a passenger cabin of the vehicle. A display module, on the display: displays a first portion of the video from within a first predetermined portion of the predetermined FOV, the first predetermined portion of the predetermined FOV being defined by a second predetermined horizontal AOV and a second predetermined vertical AOV; and selectively displays a second portion of the video from within a second predetermined portion of the predetermined FOV, the second predetermined portion of the predetermined FOV being defined by a third predetermined horizontal AOV and a third predetermined vertical AOV. At least one of: the third predetermined horizontal AOV is greater than the second predetermined horizontal AOV; and the third predetermined vertical AOV is greater than the second predetermined horizontal AOV.

In further features, the display module displays the second portion of the video from within the second predetermined portion of the predetermined FOV for a merging event of the vehicle.

In further features, the display module displays the second portion of the video from within the second predetermined portion of the predetermined FOV for a lane change event of the vehicle.

In further features, a lane change module indicates the occurrence of the lane change event when a vehicle speed is greater than a predetermined speed and a driver has turned ON a turn indicator of the vehicle.

In further features, the display module displays the second portion of the video from within the second predetermined portion of the predetermined FOV when a transmission of the vehicle is in reverse.

In further features, both: the third predetermined horizontal AOV is greater than the second predetermined horizontal AOV; and the third predetermined vertical AOV is greater than the second predetermined vertical AOV.

In further features, at least one of: the third predetermined horizontal AOV is less than the first predetermined horizontal AOV; and the third predetermined vertical AOV is less than the first predetermined vertical AOV.

In further features, both: the third predetermined horizontal AOV is less than the first predetermined horizontal AOV; and the third predetermined vertical AOV is less than the first predetermined vertical AOV.

In further features, a camera actuator module selectively vertically tilts the side rear view camera up to a predetermined position in response to a user input.

In further features, a camera actuator module selectively vertically tilts the side rear view camera down to a predetermined position in response to a user input.

In a feature, a method includes: receiving video from a side rear view camera that is located at a driver or passenger side of the vehicle and that captures video beside and behind the vehicle, the side rear view camera having a predetermined field of view (FOV), the predetermined FOV defined by a first predetermined horizontal angle of view (AOV) and a first predetermined vertical AOV; displaying, on a display that is located and visible within a passenger cabin of the vehicle, a first portion of the video from within a first predetermined portion of the predetermined FOV, the first predetermined portion of the predetermined FOV being defined by a second predetermined horizontal AOV and a second predetermined vertical AOV; and selectively displaying, on the display, a second portion of the video from within a second predetermined portion of the predetermined FOV, the second predetermined portion of the predetermined FOV being defined by a third predetermined horizontal AOV and a third predetermined vertical AOV. At least one of: the third predetermined horizontal AOV is greater than the second predetermined horizontal AOV; and the third predetermined vertical AOV is greater than the second predetermined horizontal AOV.

In further features, selectively displaying the second portion of the video includes displaying the second portion of the video from within the second predetermined portion of the predetermined FOV for a merging event of the vehicle.

In further features, selectively displaying the second portion of the video includes displaying the second portion of the video from within the second predetermined portion of the predetermined FOV for a lane change event of the vehicle.

In further features, the method further includes identifying the occurrence of the lane change event when a vehicle speed is greater than a predetermined speed and a driver has turned ON a turn indicator of the vehicle.

In further features, selectively displaying the second portion of the video includes displaying the second portion of the video from within the second predetermined portion of the predetermined FOV when a transmission of the vehicle is in reverse.

In further features, both: the third predetermined horizontal AOV is greater than the second predetermined horizontal AOV; and the third predetermined vertical AOV is greater than the second predetermined vertical AOV.

In further features, at least one of: the third predetermined horizontal AOV is less than the first predetermined horizontal AOV; and the third predetermined vertical AOV is less than the first predetermined vertical AOV.

In further features, both: the third predetermined horizontal AOV is less than the first predetermined horizontal AOV; and the third predetermined vertical AOV is less than the first predetermined vertical AOV.

In further features, the method further includes selectively vertically tilting the side rear view camera up to a predetermined position in response to a user input.

In further features, the method further includes selectively vertically tilting the side rear view camera down to a predetermined position in response to a user input.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Side (outside) rear view cameras capture video from beside and behind a vehicle. For example, a left side rear view camera captures video from a left side and behind the vehicle, and a right side rear view camera captures video from a right side and behind the vehicle. Some vehicles may not include side rear view mirrors, for example, to reduce aerodynamic drag. In the place of side rear view mirrors, video captured using side rear view cameras may be displayed on side rear view displays located within a passenger cabin of the vehicle.

Side rear view cameras have a predetermined field of view (FOV). A display control module may display video from within a portion of the predetermined FOV on an associated side rear view display within the passenger cabin to provide views of what may be visible via rear side view mirrors. According to the present application, the display control module selectively varies the portion of the predetermined FOV under various circumstances.

The display control module may generally display video from within a first predetermined portion (a first predetermined FOV) of the predetermined FOV of a side rear view camera. The display control module may display video from within a second predetermined portion (a second predetermined FOV) of the predetermined FOV of the side rear view camera for a merging event of the vehicle, for a lane change event of the vehicle, and for a reverse parking event of the vehicle. The second predetermined portion is vertically and/or horizontally greater (angularly) than the first predetermined portion. As such, when video from the second predetermined portion is displayed, features within the video will be visibly smaller than those same features if video from the first predetermined portion was displayed. Video from a greater area of the predetermined FOV will be displayed when the second predetermined portion is used. This may provide a more relevant video to the driver during merging, lane change, and reverse parking events and replicates what a driver may view via a side rear view mirror by moving his or her head toward the side rear view mirror.

A side rear view camera may be fixed such that the predetermined FOV of the side rear view camera is fixed. Alternatively, a side rear view camera may be actuatable such that the predetermined FOV may be tilted vertically upwards and downwards. According to the present application, the display control module may actuate a side rear view camera upwards and downwards under various circumstances to better position the predetermined FOV for the circumstances. For example, the display control module may actuate a side rear view camera vertically downward for lane sensing and for generating views from above the vehicle. The display control module may actuate a side rear view camera vertically upwards for generating 360 degree views around the vehicle and for recording video of surroundings of the vehicle.

Figure 1A:
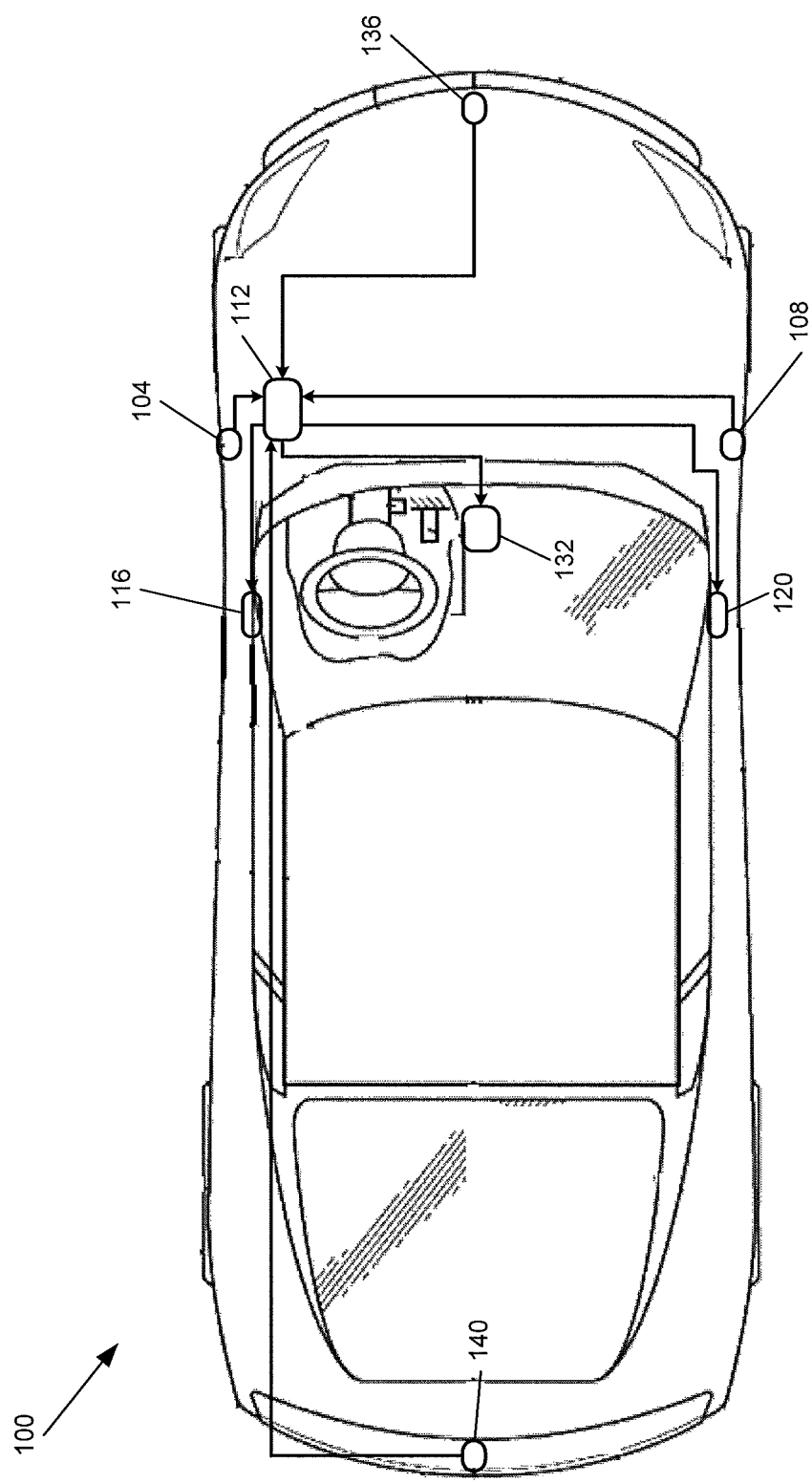
FIGS. 1A and 1B are overhead views of an example vehicle.

FIG. 1A is an overhead (top) view of an example vehicle 100 including a functional block diagram of an example side rear view camera system. The vehicle 100 includes a left side rear view camera 104 and a right side rear view camera 108. The left side rear view camera 104 captures video to the left and behind the vehicle 100 and has a predetermined field of view (FOV). The right side rear view camera 108 captures video to the right and behind the video and also has the predetermined FOV. The predetermined FOV is defined by a predetermined vertical angle of view (AOV) and a predetermined horizontal AOV, as discussed further below.

FIG. 1A illustrates the vehicle 100 not including side rear view mirrors. Omission of side rear view mirrors may decrease fuel consumption of the vehicle 100 by reducing aerodynamic drag.

A display control module 112 displays video captured using the left side rear view camera 104 on a left side rear view display 116 to provide visual feedback that a left side rear view mirror may provide. The display control module 112 also displays video captured using the right side rear view camera 108 on a right side rear view display 120 to provide visual feedback that a right side rear view mirror may provide. The left and right side rear view displays 116 and 120 may be, for example, liquid crystal displays (LCDs), light emitting diode (LED) displays, or another suitable type of video display.

The left side rear view camera 104 may be positioned at or forward of a location where the left side rear view mirror would otherwise be implemented, such as at A pillars of the vehicle. The right side rear view camera 108 may be positioned at or forward of a location where the right side rear view mirror would otherwise be implemented. The left and right side rear view cameras 104 and 108 may be fixed cameras and have a fixed FOV, such as in the example of FIG. 1A.

Figure 1B:
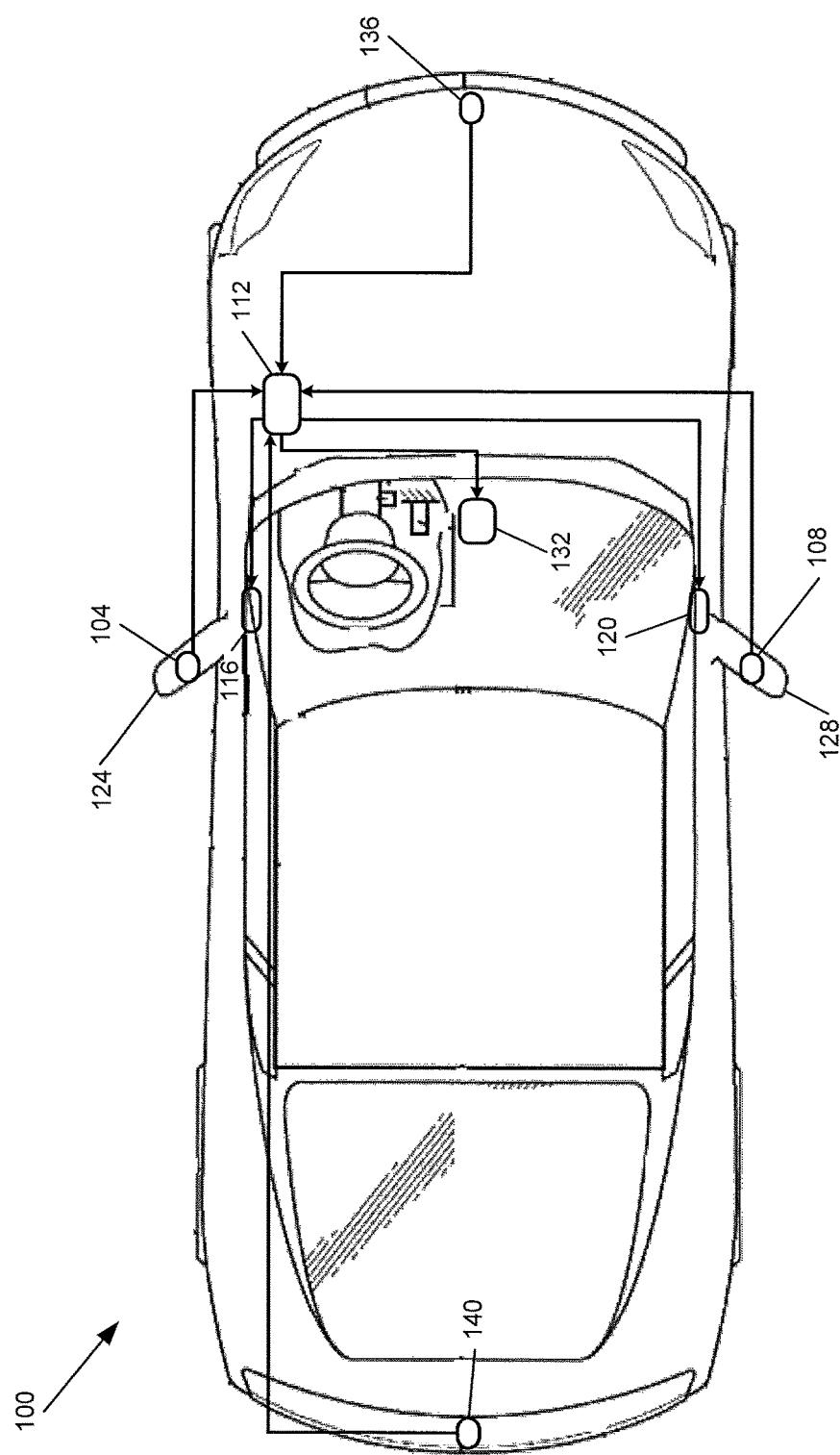

Alternatively, such as in FIG. 1B, the left and right side rear view cameras 104 and 108 may be tilted (e.g., vertically) to achieve different FOVs depending on a tilt position. FIG. 1B includes an overhead view of the vehicle 100 including a functional block diagram of the example side rear view camera system. The vehicle 100 of FIG. 1B also includes left and right side rear view mirrors 124 and 128. Since the vehicle 100 of FIG. 1B includes the left and right side rear view mirrors 124 and 128, the left and right side rear view displays 116 and 120 may be omitted.

Referring now to FIGS. 1A and 1B, the display control module 112 may additionally or alternatively display video captured using the left side rear view camera 104, the right side rear view camera 108, and/or one or more other cameras of the vehicle on one or more other displays, such as a center console display 132. For example, in FIG. 1B, the display control module 112 may display video captured using the left and right side rear view cameras 104 and 108 on the center console display 132. Other cameras include, but are not limited to, one or more forward facing cameras, such as forward facing camera 136, one or more backward facing cameras, such as backward facing camera 140, and one or more other right and/or left side cameras.

The display control module 112 may also display video on one or more displays of the vehicle based on signals received from other types of vehicle surroundings sensors, such as LIDAR sensors, radar sensors, laser sensors, etc. While example locations are provided, the forward and backward facing cameras 136 and 140 may be located differently and/or one or more other backward and forward facing cameras may be provided. The left and right side rear view cameras forward and backward facing cameras 136 and 140 may be located in other locations to capture video from locations beside the vehicle 100 that could be viewed via the left and right side rear view mirrors 124 and 128.

Figure 2:
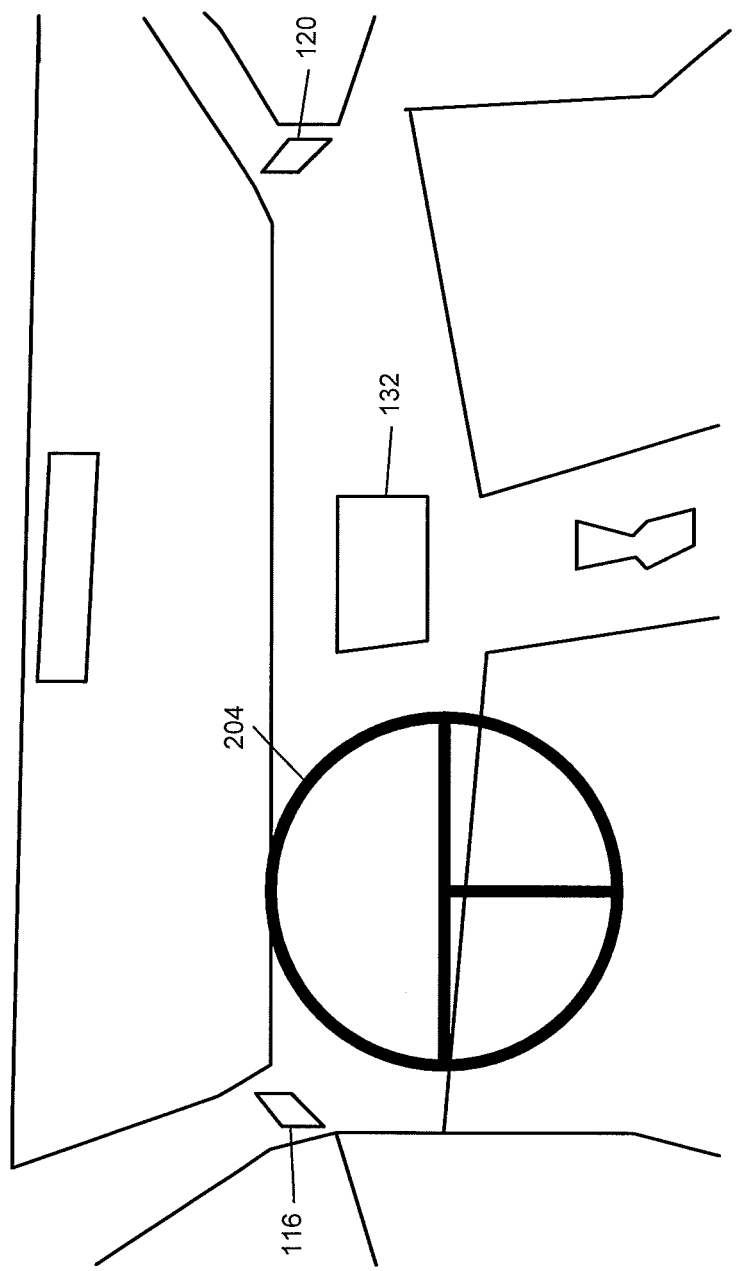
FIG. 2 is an example illustration from the perspective of a driver seat within a passenger cabin of the vehicle.

FIG. 2 is an example illustration from a driver seat within a passenger cabin of the vehicle 100. The left and right side rear view displays 116 and 120 and the center console display 132 are visible from the driver seat and other locations within the passenger cabin of the vehicle. As discussed above, however, the center console display 132 or the left and right side rear view displays 116 and 120 may be omitted in various implementations. The driver turns a steering wheel 204 to turn steer the vehicle 100, such as to change lanes, merge, and park the vehicle 100.

Referring back to FIGS. 1A and 1B, the display control module 112 generally displays a first predetermined FOV of video captured using the left and right side rear view cameras 104 and 108 on the left and right side rear view displays 116 and 120. The first predetermined FOV may be vertically and/or horizontally narrower (angularly) than the predetermined FOV of the left and right side rear view cameras 104 and 108.

Figure 3A:
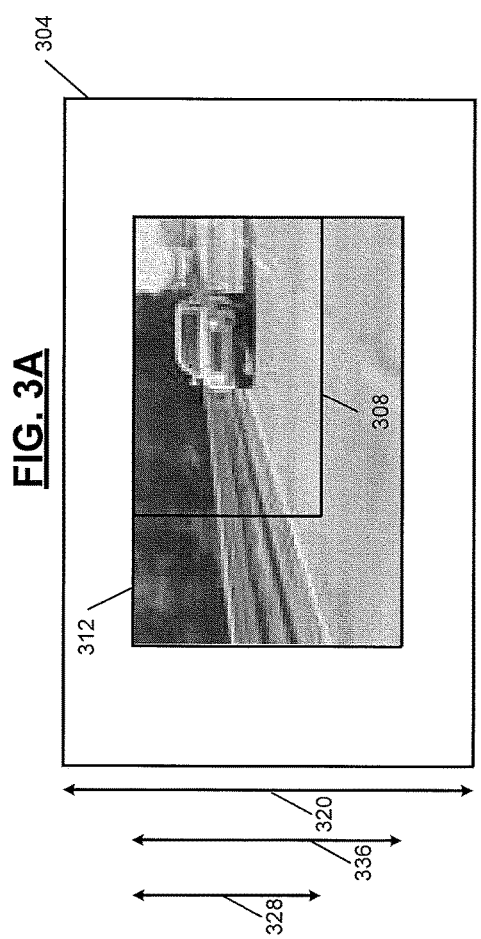
FIGS. 3A, 3B, and 3C include example illustrations of video from various different fields of view (FOVs)

FIG. 3A includes an example illustration including the predetermined FOV 304 of the right side rear view camera 108. The predetermined FOV 304 is defined by a first predetermined horizontal angle of view (AOV) 316 and a first predetermined vertical AOV 320.

Figure 3C:
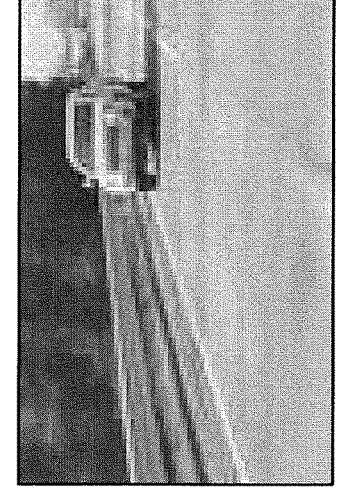
Figure 3B:
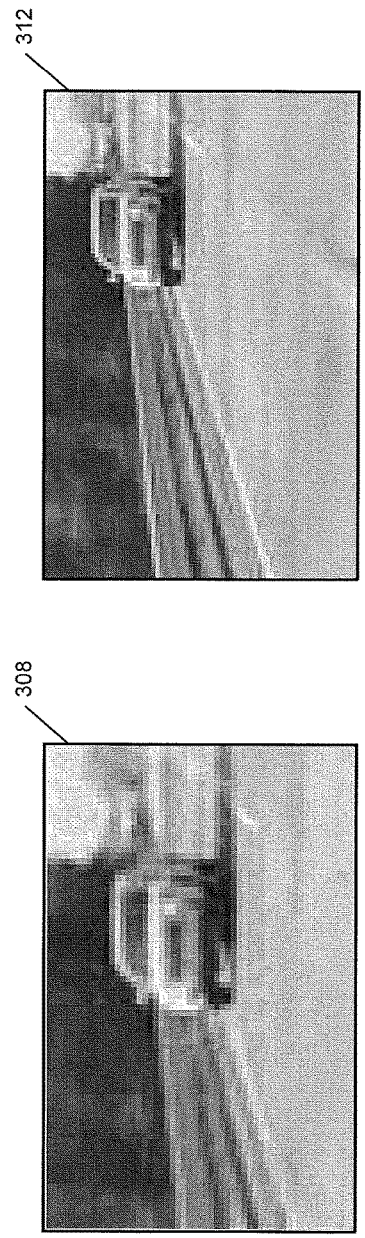

FIG. 3B includes an example illustration of the first predetermined FOV 308 of the predetermined FOV 304 displayed on the right side rear view display 120. The first predetermined FOV 308 is defined by a second predetermined horizontal AOV 324 and a second predetermined vertical AOV 328. The second predetermined horizontal AOV 324 is less than the first predetermined horizontal AOV 316, and the second predetermined vertical AOV 328 is less than the first predetermined vertical AOV 320.

Referring back to FIGS. 1A and 1B, the display control module 112 varies the FOV displayed on a side rear view display when one or more conditions occur. For example, the display control module 112 displays video from within a second predetermined FOV on the left side rear view display 116 for a leftward merging event, a leftward lane changing event, and reverse parking of the vehicle. The display control module 112 displays video from within the second predetermined FOV on the right side rear view display 120 for a rightward merging event, a rightward lane changing event, and reverse parking of the vehicle.

FIG. 3C includes an example illustration of the second predetermined FOV 312 of the predetermined FOV 304 displayed on the right side rear view display 120. The second predetermined FOV 312 is defined by a third predetermined horizontal AOV 332 and a third predetermined vertical AOV 336. The third predetermined horizontal AOV 332 may be greater than the second predetermined horizontal AOV 324, and/or the third predetermined vertical AOV 336 may be greater than the second predetermined vertical AOV 328.

In other words, the second predetermined FOV 312 is vertically and/or horizontally greater (angularly) than the first predetermined FOV 308. As can be seen by comparing FIGS. 3B and 3C, the second predetermined FOV 312 may be vertically and horizontally greater than the first predetermined FOV 308 such that a greater area of the predetermined FOV 304 will be displayed on the right side rear view display 120. The second predetermined FOV 312 may be vertically and/or horizontally narrower (angularly) than the predetermined FOV 304 of the left and right side rear view cameras 104 and 108. While the example of the second predetermined FOV being vertically and horizontally narrower than the predetermined FOV of the left and right side rear view cameras 104 and 108 is provided, the second predetermined FOV may be vertically and/or horizontally equal to the predetermined FOV of the left and right side rear view cameras 104 and 108. Predetermined FOVs narrower than the predetermined FOV 304 of the left and right side rear view cameras 104 and 108 may be displayed, for example, to minimize image distortion that may occur near the edges of the predetermined FOV 304. While the example of the right side rear view display 120 is illustrated in FIGS. 3A, 3B, and 3C, the same is also applicable to the left side rear view display 120.

Figure 4:
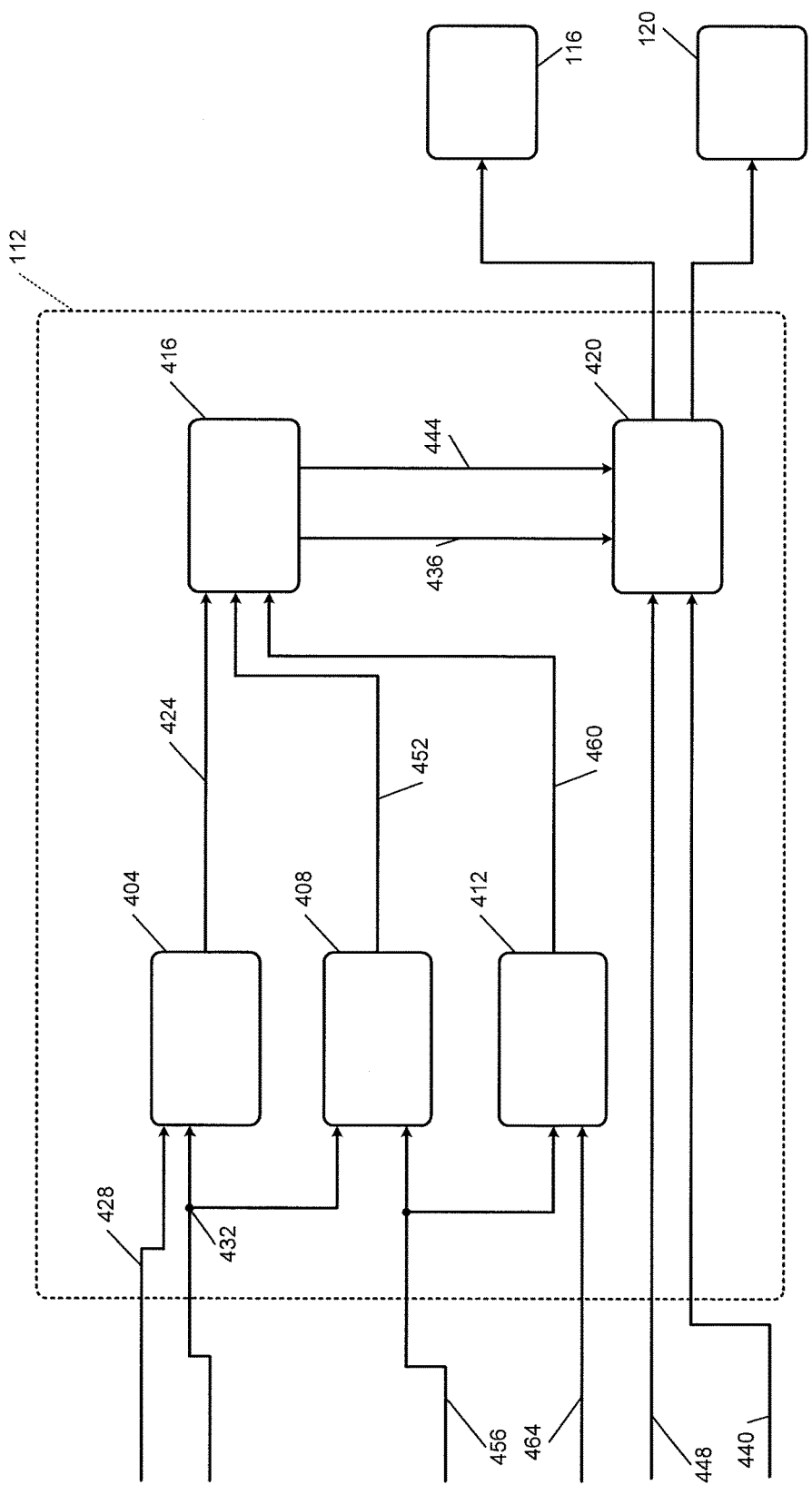
FIG. 4 is a functional block diagram of an example implementation of a display control module.
Figure 5:
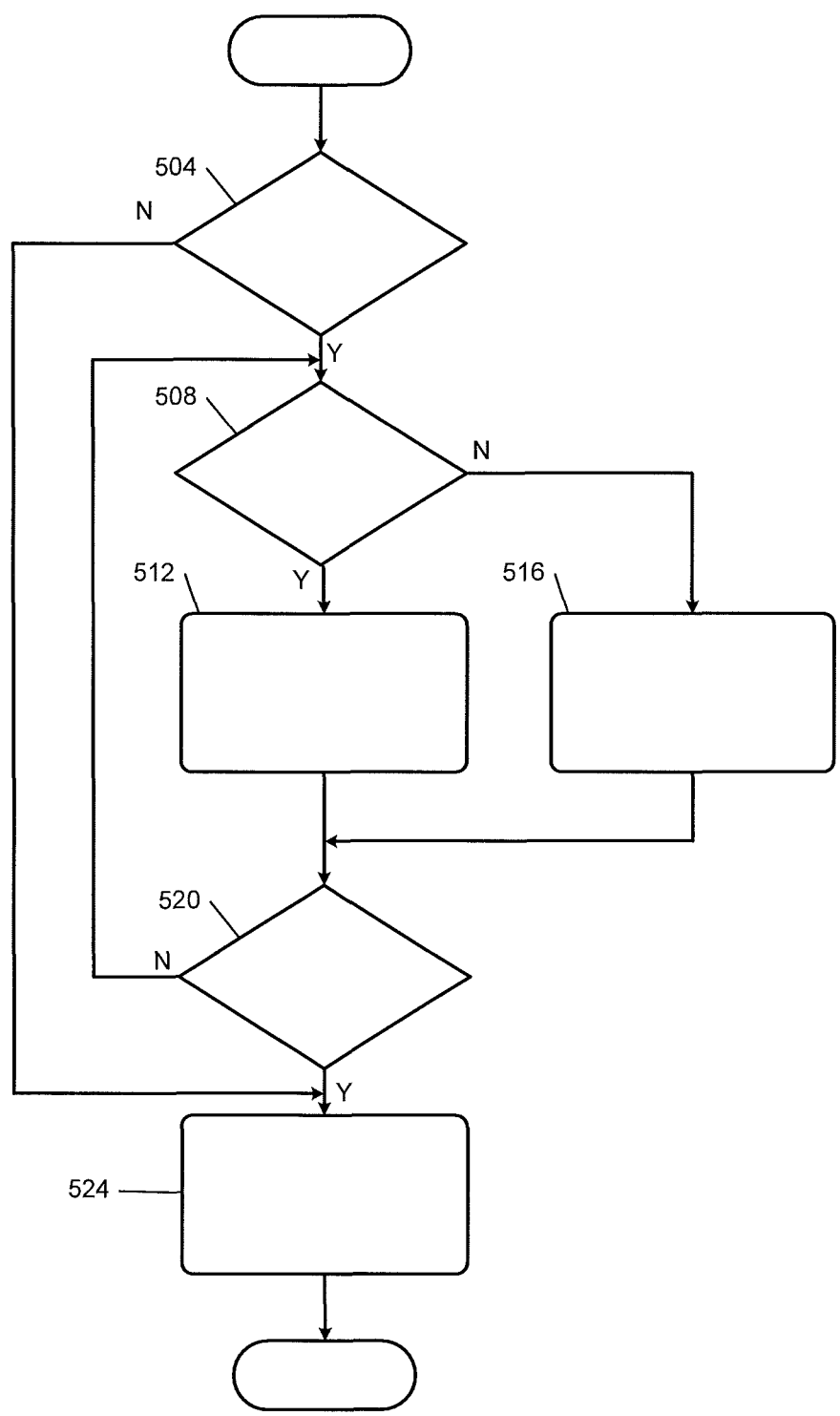
FIG. 5 is a flowchart depicting an example method of varying a FOV of video displayed on a side rear view display based on whether a vehicle is merging.

FIG. 4 is a functional block diagram of an example implementation of the display control module 112. The display control module 112 may include a merging module 404, a lane change module 408, a parking module 412, a field of view module 416, and a display module 420. FIG. 5 includes a flowchart depicting an example method of varying a FOV displayed on a side rear view display based on whether the vehicle 100 is merging.

Referring now to FIGS. 4 and 5, the merging module 404 (FIG. 4) generates a merging signal 424 that indicates whether a merging event is occurring at 504 (FIG. 5). If a merging event is occurring, the merging module 404 may set the merging signal 424 to a first state indicating that a merging event is occurring, and control continues with 508. If a merging event is not occurring, the merging module 404 may set the merge signal 424 to a second state indicating that a merging event is not occurring, and control transfers to 524 which is discussed further below. A merging event may occur when the vehicle 100 is presently merging into a lane and/or when the vehicle 100 will likely merge into a lane (e.g., within a predetermined period in the future from a present time).

The merging module 404 may determine that a merging event is occurring when an advanced driver assistance system (ADAS) indicates via a merge signal 428 that a merge event is occurring. ADAS systems may indicate that a merging event is occurring, for example, when a visual indicator of a merging event is captured, such as an image from in front of the vehicle 100 (e.g., captured via a forward facing camera) including a merge road sign, a merge lane marking, or a pattern in lane lines indicative of merging. Additionally or alternatively, the merging module 404 may determine that a merging event is occurring when a driver actuates a turn signal lever to activate a turn indicator (e.g., lights or lamps) of the vehicle 100. A turn signal 432 may indicate whether the driver has activated a turn indicator of the vehicle 100.

At 508, the merging module 404 may determine whether the merging event is rightward. The turn signal 432 and/or the merge signal 428 may indicate whether the merging event is leftward or rightward. If 508 is true (the merging event is in the rightward direction), control continues with 512. At 512, the field of view module 416 (FIG. 4) sets a right FOV signal 436 to a first state. When the right FOV signal 436 is in the first state, on the right side rear view display 120, also at 512 the display module 420 displays video from within the second predetermined FOV of right side rear view video 440 captured using the right side rear view camera 108. The right side rear view video 440 includes video within the predetermined FOV, but the display module 420 displays only video from within the second predetermined FOV of the right side rear view video 440.

If 508 is false (the merging event is in the leftward direction), control continues with 516. At 516, the field of view module 416 sets a left FOV signal 444 to a first state. When the left FOV signal 444 is in the first state, on the left side rear view display 116, also at 516 the display module 420 displays video from within the second predetermined FOV of left side rear view video 448 captured using the left side rear view camera 104. The left side rear view video 448 includes video within the predetermined FOV, but the display module 420 displays only video from within the second predetermined FOV of the left side rear view video 448.

Also at 512, the field of view module 416 may set the left FOV signal 444 to the first state or a second state. When the left FOV signal 444 is in the second state, on the left side rear view display 116, the display module 420 displays video from within the first predetermined FOV of left side rear view video 448 captured using the left side rear view camera 104. Also at 516, the field of view module 416 may set the right FOV signal 436 to the first state or a second state. When the right FOV signal 436 is in the second state, on the right side rear view display 120, the display module 420 displays video from within the first predetermined FOV of right side rear view video 440 captured using the right side rear view camera 108.

Control continues from 512 and 516 to 520. At 520, the merging module 404 determines whether the merging event is complete. For example, the merging module 404 may determine whether the merge signal 428 has transitioned to a second state and/or the turn signal 432 indicates that the driver has turned off the turn indicator. If 520 is false, control may return to 508 to continue displaying video from within the second predetermined FOV. If 520 is true, control continues with 524.

At 524, the field of view module 416 may set the right and left FOV signals 436 and 444 to the second state. As stated above, when the right FOV signal 436 is in the second state, on the right side rear view display 120, the display module 420 displays video from within the first predetermined FOV of right side rear view video 440 captured using the right side rear view camera 108. When the left FOV signal 444 is in the second state, on the left side rear view display 116, the display module 420 displays video from within the first predetermined FOV of left side rear view video 448 captured using the left side rear view camera 104. While the example of FIG. 5 is shown as ending after 524, control may return to 504 for a next control loop.

Figure 6:
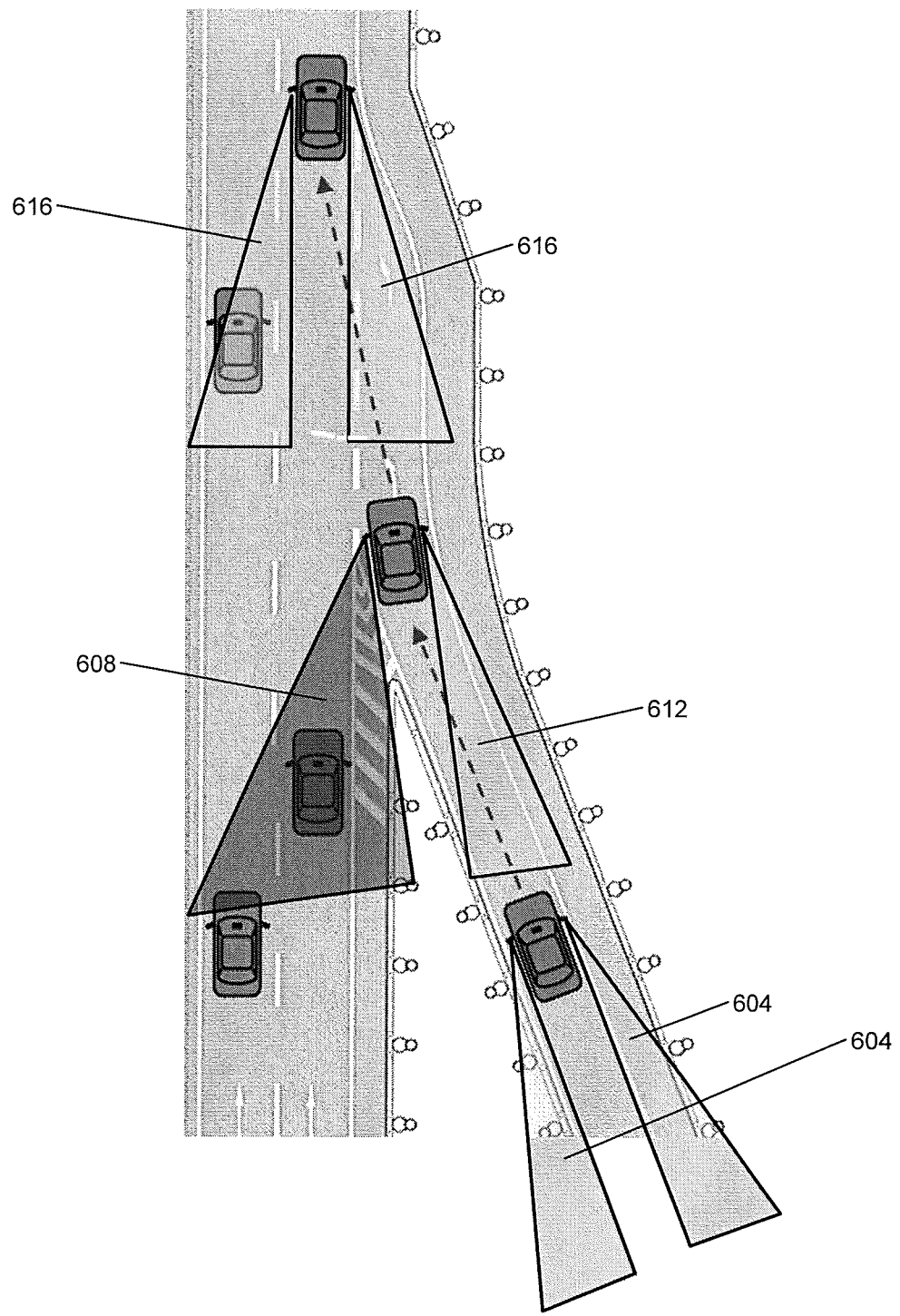
FIG. 6 is an example illustration of FOV used before, during, and after a leftward merging event.

FIG. 6 includes an example illustration of FOV used before, during, and after a leftward merging event. As illustrated by 604, video from the first predetermined FOV is displayed prior to a merging event. As illustrated by 608, the video from the second (greater) predetermined FOV is displayed on the left side rear view display 116 during the leftward merging event. As illustrated by 616, video from the first predetermined FOV is displayed after the merging event is complete.

While the example of FIG. 6 illustrates at 612 the example of video from the first predetermined FOV being displayed on the right side rear view display 120 during the merging event, the second predetermined FOV could also be used for the right side rear view display 120 during the merging event. Also, while the example of FIG. 6 illustrates the example of the second predetermined FOV being angularly greater than the first predetermined FOV in the horizontal direction, the second predetermined FOV may also be angularly greater than the first predetermined FOV in the vertical direction.

Figure 7:
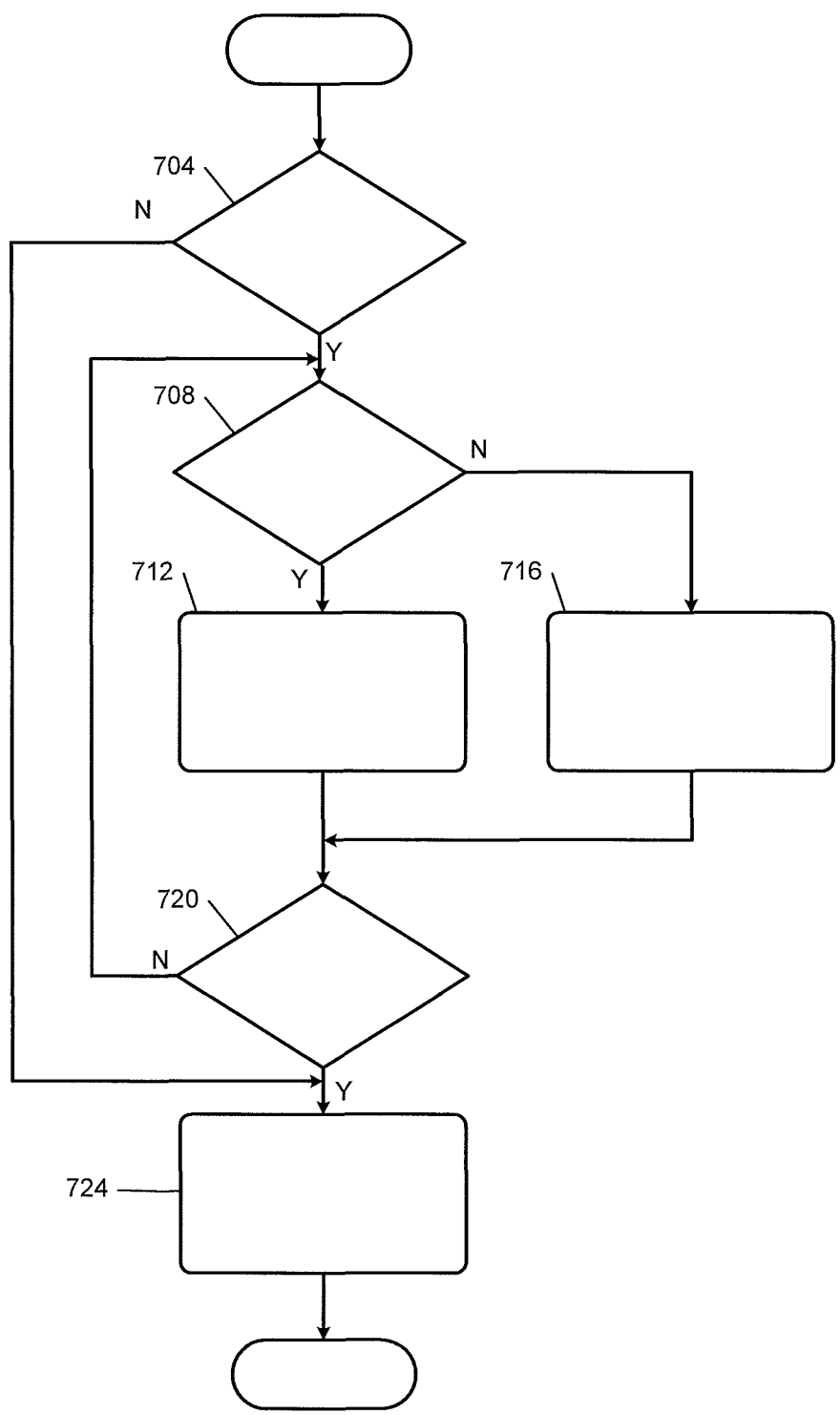
FIG. 7 is a flowchart depicting an example method of varying a FOV of video displayed on a side rear view display based on whether a vehicle is changing lanes.

FIG. 7 includes a flowchart depicting an example method of varying a FOV displayed on a side rear view display based on whether the vehicle 100 is changing lanes. Referring now to FIGS. 4 and 7, the lane change module 408 (FIG. 4) generates a lane change signal 452 that indicates whether a lane change event is occurring at 704 (FIG. 7).

If a lane change event is occurring, the lane change module 408 may set the lane change signal 452 to a first state indicating that a lane change event is occurring, and control continues with 708. If a lane change event is not occurring, the lane change module 408 may set the lane change signal 452 to a second state indicating that a lane change event is not occurring, and control transfers to 724 which is discussed further below. A lane change may occur when the vehicle 100 is or may change lanes of a road.

The lane change module 408 may determine that a lane change event is occurring when the turn signal 432 indicates that the driver has activated a turn indicator of the vehicle 100 and a vehicle speed 456 is greater than a first predetermined speed. The first predetermined speed is greater than zero and may be, for example, greater than or equal to 25 miles per hour or another suitable speed. The vehicle speed 456 may be measured using one or more sensors. For example, the vehicle speed 456 may be set based on or equal to one or more wheel speeds measured using wheel speed sensors, respectively.

At 708 (FIG. 7), the lane change module 408 may determine whether the merging event is rightward. The turn signal 432 may indicate whether the merging event is leftward or rightward. If 708 is true (the lane change event is in the rightward direction), control continues with 712. At 712, the field of view module 416 (FIG. 4) sets the right FOV signal 436 to the first state. When the right FOV signal 436 is in the first state, on the right side rear view display 120, also at 712 the display module 420 displays video from within the second predetermined FOV of right side rear view video 440 captured using the right side rear view camera 108. The right side rear view video 440 includes video within the predetermined FOV, but the display module 420 displays only video from within the second predetermined FOV of the right side rear view video 440.

If 708 is false (the lane change event is in the leftward direction), control continues with 716. At 716, the field of view module 416 sets the left FOV signal 444 to the first state. When the left FOV signal 444 is in the first state, on the left side rear view display 116, also at 716 the display module 420 displays video from within the second predetermined FOV of left side rear view video 448 captured using the left side rear view camera 104. The left side rear view video 448 includes video within the predetermined FOV, but the display module 420 displays only video from within the second predetermined FOV of the left side rear view video 448.

Also at 712, the field of view module 416 may set the left FOV signal 444 to the first state or the second state. When the left FOV signal 444 is in the second state, on the left side rear view display 116, the display module 420 displays video from within the first predetermined FOV of left side rear view video 448 captured using the left side rear view camera 104. Also at 716, the field of view module 416 may set the right FOV signal 436 to the first state or the second state. When the right FOV signal 436 is in the second state, on the right side rear view display 120, the display module 420 displays video from within the first predetermined FOV of right side rear view video 440 captured using the right side rear view camera 108.

Control continues from 712 and 716 to 720. At 720, the lane change module 408 determines whether the lane change event is complete. For example, the lane change module 408 may determine whether the turn signal 432 indicates that the driver has turned off the turn indicator. If 720 is false, control may return to 708 to continue displaying video from within the second predetermined FOV. If 720 is true, control continues with 724.

At 724, the field of view module 416 may set the right and left FOV signals 436 and 444 to the second state. As stated above, when the right FOV signal 436 is in the second state, on the right side rear view display 120, the display module 420 displays video from within the first predetermined FOV of right side rear view video 440 captured using the right side rear view camera 108. When the left FOV signal 444 is in the second state, on the left side rear view display 116, the display module 420 displays video from within the first predetermined FOV of left side rear view video 448 captured using the left side rear view camera 104. While the example of FIG. 7 is shown as ending after 724, control may return to 704 for a next control loop.

Figure 8:
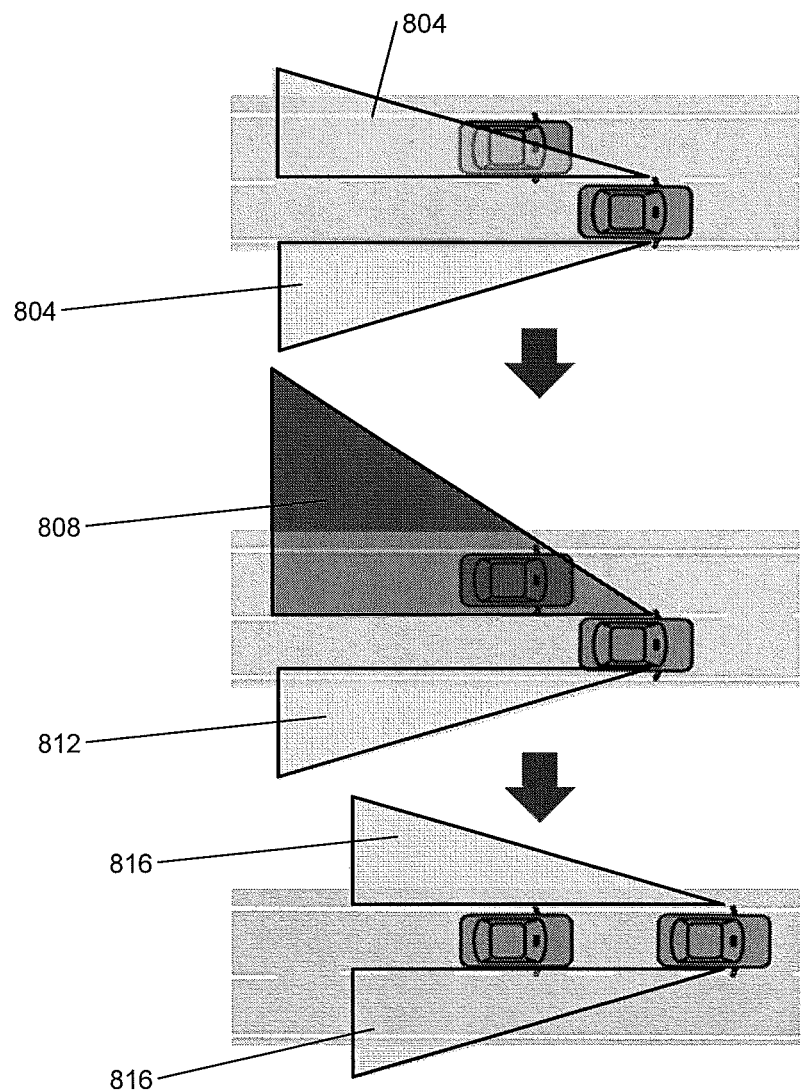
FIG. 8 is an example illustration of FOV used before, during, and after a leftward lane change event.

FIG. 8 includes an example illustration of FOV used before, during, and after a leftward lane change event. As illustrated by 804, video from the first predetermined FOV is displayed prior to a lane change event. As illustrated by 808, the video from the second (greater) predetermined FOV is displayed on the left side rear view display 116 during the leftward merging event. As illustrated by 816, video from the first predetermined FOV is displayed after the lane change event is complete.

While the example of FIG. 8 illustrates at 812 the example of video from the first predetermined FOV being displayed on the right side rear view display 120 during the merging event, the second predetermined FOV could also be used for the right side rear view display 120 during the merging event. Also, while the example of FIG. 8 illustrates the example of the second predetermined FOV being angularly greater than the first predetermined FOV in the horizontal direction, the second predetermined FOV may also be angularly greater than the first predetermined FOV in the vertical direction.

Figure 9:
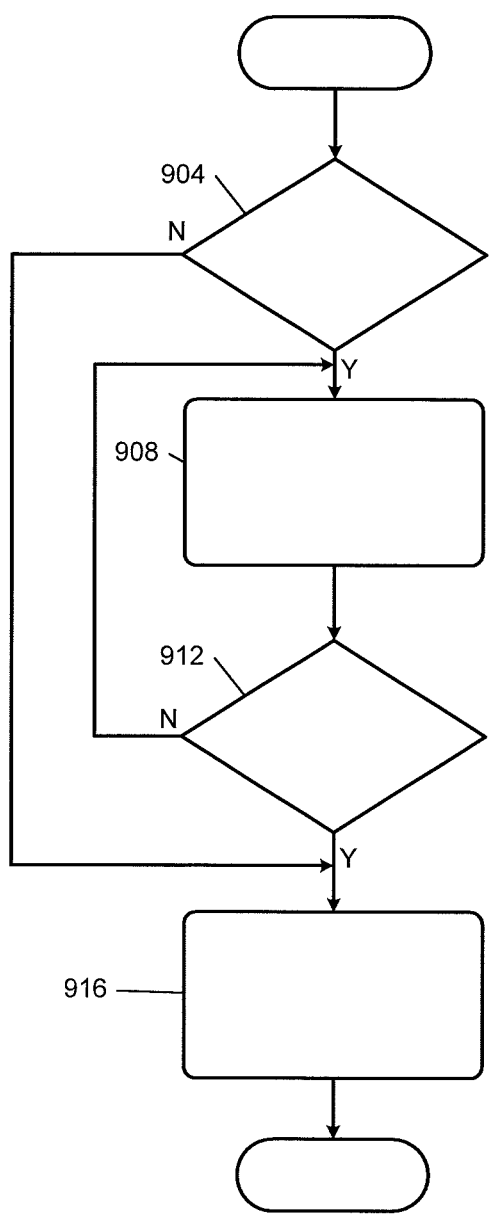
FIG. 9 is a flowchart depicting an example method of varying a FOV of video displayed on a side rear view display based on whether a vehicle is parking in reverse.

FIG. 9 includes a flowchart depicting an example method of varying a FOV displayed on a side rear view display based on whether the vehicle 100 is parking in reverse. Referring now to FIGS. 4 and 9, the parking module 412 (FIG. 4) generates a parking signal 460 that indicates whether a parking event is occurring at 904 (FIG. 9).

If a parking event is occurring, the parking module 412 may set the parking signal 460 to a first state indicating that a parking event is occurring, and control continues with 908. If a parking event is not occurring, the parking module 412 may set the parking signal 460 to a second state indicating that a parking event is not occurring, and control transfers to 916 which is discussed further below. A parking event may occur, for example, when the vehicle 100 is moving backward to park the vehicle 100 at a location.

The parking module 412 may determine that a parking event is occurring when the vehicle 100 is traveling backward (i.e., in reverse) and a steering wheel angle (SWA) 464 is greater than a predetermined angle. The vehicle speed 456 being greater than a second predetermined speed while a transmission of the vehicle is in a reverse gear may indicate that the vehicle 100 is traveling backward. The second predetermined speed is greater than zero and may be, for example, approximately 1 mile per hour or another suitable speed. The SWA 464 may be measured using a SWA sensor that measures a present angle of the steering wheel 204 relative to a predetermined reference angle. The predetermined reference angle may be, for example, an angle of the steering wheel 204 where the vehicle 100 may travel along a longitudinal axis of the vehicle 100.

At 908 (FIG. 9), the field of view module 416 (FIG. 4) may set the right and left FOV signals 436 and 444 to the first state. When the right FOV signal 436 is in the first state, on the right side rear view display 120, also at 908 the display module 420 displays video from within the second predetermined FOV of right side rear view video 440 captured using the right side rear view camera 108. The right side rear view video 440 includes video within the predetermined FOV, but the display module 420 displays only video from within the second predetermined FOV of the right side rear view video 440. When the left FOV signal 444 is in the first state, on the left side rear view display 116, also at 908 the display module 420 displays video from within the second predetermined FOV of left side rear view video 448 captured using the left side rear view camera 104. The left side rear view video 448 includes video within the predetermined FOV, but the display module 420 displays only video from within the second predetermined FOV of the left side rear view video 448.

At 912, the parking module 412 determines whether the parking event is complete. For example, the parking module 412 may determine whether the vehicle speed 456 is less than the second predetermined speed and/or the SWA 464 is less than the predetermined angle. If 912 is false, control may return to 908 to continue displaying video from within the second predetermined FOV. If 908 is true, control continues with 916.

At 916, the field of view module 416 may set the right and left FOV signals 436 and 444 to the second state. As stated above, when the right FOV signal 436 is in the second state, on the right side rear view display 120, the display module 420 displays video from within the first predetermined FOV of right side rear view video 440 captured using the right side rear view camera 108. When the left FOV signal 444 is in the second state, on the left side rear view display 116, the display module 420 displays video from within the first predetermined FOV of left side rear view video 448 captured using the left side rear view camera 104. While the example of FIG. 9 is shown as ending after 916, control may return to 904 for a next control loop.

Figure 10:
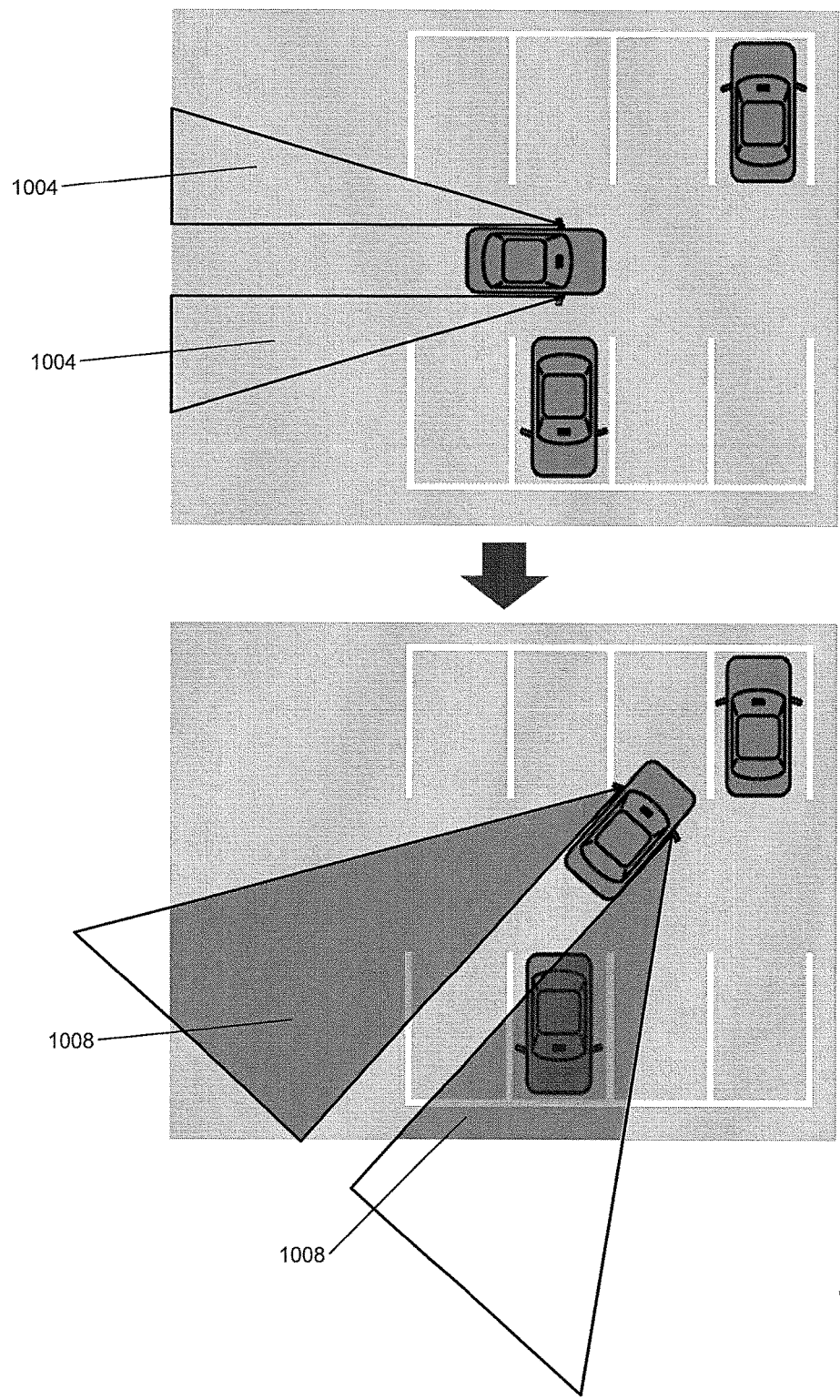
FIG. 10 includes an example illustration of FOV used before and during a reverse parking event.

FIG. 10 includes an example illustration of FOV used before and during a reverse parking event. As illustrated by 1004, video from the first predetermined FOV is displayed prior to a parking event. As illustrated by 1008, the video from the second (greater) predetermined FOV is displayed on the left and right side rear view displays 116 and 120 during the parking event. While the example of FIG. 10 illustrates the example of the second predetermined FOV being angularly greater than the first predetermined FOV in the horizontal direction, the second predetermined FOV may also be angularly greater than the first predetermined FOV in the vertical direction.

While the example of changing the FOV displayed for a parking event is provided, the field of view module 416 may additionally or alternatively display video from within the second predetermined FOV when the vehicle is in the reverse gear (and the SWA 464 is less than the predetermined angle) or the SWA 464 is greater than the predetermined angle (and independent of whether the vehicle is in reverse, such as in a forward gear). When the only vehicle is in the reverse gear (and the SWA 464 is less than the predetermined angle), the second predetermined FOV or a different predetermined FOV (e.g., vertically greater than the first predetermined FOV or a FOV of a different area) may be displayed on both the left and right side rear view displays 116 and 120. When only the SWA 464 is greater than the predetermined angle (and independent of whether the vehicle is in reverse, such as when the vehicle is in a forward drive gear), the second predetermined FOV or another predetermined FOV (e.g., vertically and/or horizontally greater than the first predetermined FOV a FOV of a different area) may be displayed on both the left and right side rear view displays 116 and 120 or on one of the left and right side rear view displays 116 and 120 in the direction that the steering wheel is turned relative to the predetermined reference angle.

Figure 11:
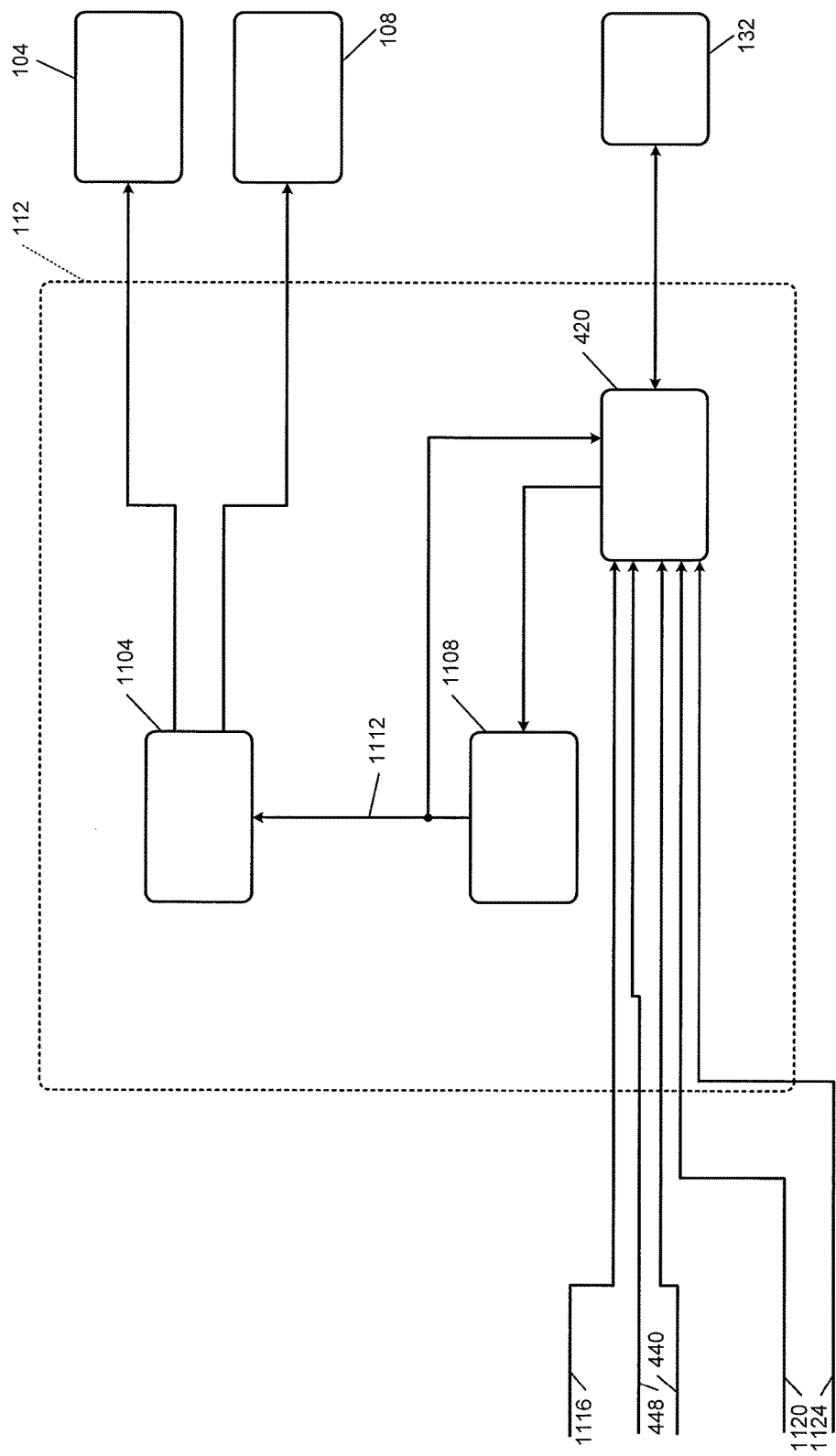
FIG. 11 is a functional block diagram of an example implementation of a display control module.

FIG. 11 is a functional block diagram of an example implementation of the display control module 112. Additionally or alternatively to FIG. 4, the display control module 112 may include a camera actuator module 1104 and a driver input module 1108.

The display module 420 may additionally or alternatively display video captured using the left side rear view camera 104, the right side rear view camera 108, and/or one or more other cameras of the vehicle the center console display 132. The center console display 132 may include a touch screen display that a user can touch to input various different types of requests. The driver input module 1112 may generate a driver request 1112 indicative of a request input by a user, for example, to the center console display 132. Based on the request 1112, the display module 420 may display content on the center console display 132 using the left side rear view video 448, the right side rear view video 440, frontward facing video 1116 captured using the forward facing camera 136, rearward video 1120 captured using the backward facing camera 140, and/or other input 1124 from other types of vehicle surroundings sensors.

The driver request 1112 may be, for example, a bowl view request, a video record request, a top down view request, a lane sense request, or a learn request. Other driver requests, however, can be input via the center console display 132.

When the driver request 1112 is a bowl view request, the display module 420 displays a driver manipulatable 360 degree view of the vehicle 100 and vehicle surroundings by, for example, stitching together the left side rear view video 448, the right side rear view video 440, frontward facing video 1116 captured using the forward facing camera 136, and rearward video 1120 captured using the backward facing camera 140. The display module 420 may also display the driver manipulatable 360 degree view of the vehicle 100 based on other input 1124.

When the driver request 1112 is a top down view, the display module 420 displays a view from above the vehicle 100 of the vehicle 100 and vehicle surroundings by, for example, stitching together the left side rear view video 448, the right side rear view video 440, frontward facing video 1116 captured using the forward facing camera 136, and rearward video 1120 captured using the backward facing camera 140. The display module 420 may also display the view from above the vehicle 100 based on other input 1124.

When the driver request 1112 is a lane sense request, the display module 420 (or another module) may identify lane lines on a road under the vehicle 100, for example, using the left side rear view video 448, the right side rear view video 440, frontward facing video 1116 captured using the forward facing camera 136, and rearward video 1120 captured using the backward facing camera 140. The display module 420 may also display an illustration of the relative position of the vehicle 100 and the lane lines on the center console display 132.

When the driver request 1112 is a video record request, the display module 420 (or another module) may record and/or display video of surroundings of the vehicle. For example, the display module 420 may record and/or display the left side rear view video 448, the right side rear view video 440, the frontward facing video 1116 captured using the forward facing camera 136, and/or the rearward video 1120 captured using the backward facing camera 140. Video record requests may also be provided independently of user input to the center console display 132, such as in response to a request from another module of the vehicle (e.g., a security system) or a in response to a request from external to the vehicle 100, such wirelessly from a computing device of an owner of the vehicle 100. Video record requests may be generated, for example, in an effort to capture images of individuals around the vehicle 100, such as an individual damaging the vehicle 100 or attempting to steal the vehicle 100. When the driver request 1112 is a learn request, the display module 420 (or another module) may perform learning based the left side rear view video 448, the right side rear view video 440, the frontward facing video 1116 captured using the forward facing camera 136, the rearward video 1120 captured using the backward facing camera 140, and/or the other inputs 1124. The display module 420 may display content on the center console display 132 (e.g., a view from above the vehicle 100 including the vehicle 100 and vehicle surroundings) as a result of the learning.

The camera actuator module 1104 actuates the left and right side rear view cameras 104 and 108 to vertically tilt the left and right side rear view cameras 104 and 108 based on the driver request 1112. For example, the left and right side rear view cameras 104 and 108 may include electric motors that vertically tilt the left and right side rear view cameras 104 and 108. Vertically tilting the left and right side rear view cameras 104 and 108 changes the area around the vehicle 100 that is within the predetermined FOV of the left and right side rear view cameras 104 and 108.

For example, the camera actuator module 1104 may actuate the left and right side rear view cameras 104 and 108 to a predetermined upward position when the driver request 1112 is a bowl view request or a video recording request. The camera actuator module 1104 may actuate the left and right side rear view cameras 104 and 108 to a predetermined downward position when the driver request 1112 is a lane sense request, a top down view request, or a learn request.

Figure 12A:
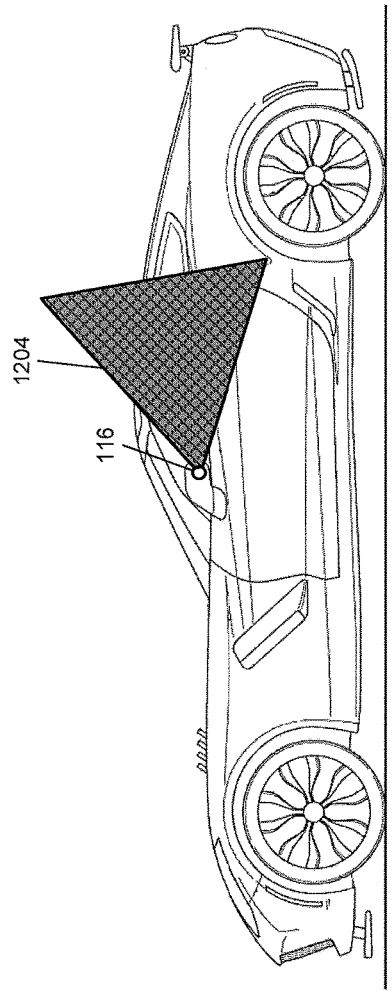
FIGS. 12A and 12B illustrate the predetermined FOV of a left side rear view camera when tilted upward and downward.
Figure 12B:
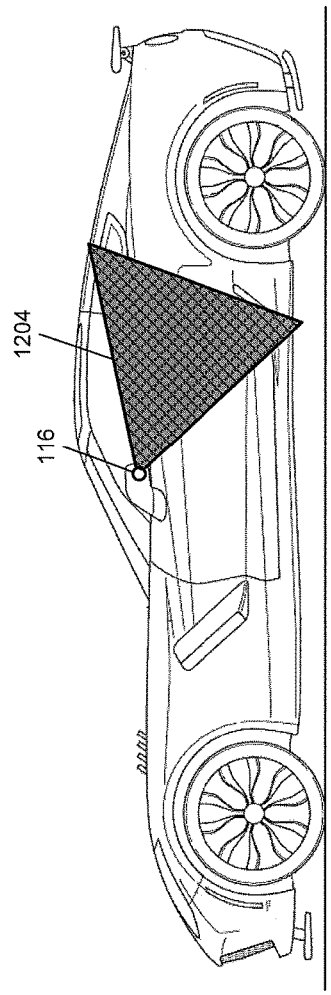

FIGS. 12A and 12B are example side views of the vehicle 100 and predetermined FOVs. When the left side rear view camera 104 is in the predetermined upward position, the predetermined FOV of the left side rear view camera 104 (upper and lower edges of the predetermined FOV) is vertically higher than when the left side rear view camera 104 is in the predetermined downward position. The same is true for the right side rear view camera 108.

FIG. 12A illustrates the predetermined FOV 1204 of the left side rear view camera 104 when in the predetermined upward position, while FIG. 12B illustrates the predetermined FOV 1204 when in the predetermined downward position. While the example of the predetermined upward and downward positions is provided, more than two different predetermined positions may be used. For example, the camera actuator module 1104 may actuate the left and right side rear view cameras 104 and 108 to different predetermined positions for each different type of the driver request 1112.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." As described above, directional terms, such as forward, backward, rightward, leftward, etc. are reference to a normal forward (drive) direction of travel. Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object' Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A side rear view camera system, comprising:
   a right side rear view camera that captures a first video of a first area at least one of to the right of and behind a vehicle, and that has a predetermined field of view (FOV), the predetermined FOV defined by a first predetermined horizontal angle of view (AOV) and a first predetermined vertical AOV;
   a right side display located on a right side of the vehicle;
   a left side rear view camera that captures a second video of a second area at least one of to the left of and behind the vehicle, and that has the predetermined FOV;
   a left side display located on a left side of the vehicle; and
   a display module that:
      on the right side display, displays a first portion of the first video from within a first predetermined portion of the predetermined FOV of the right side rear view camera, the first predetermined portion of the predetermined FOV being defined by a second predetermined horizontal AOV and a second predetermined vertical AOV;
      on the left side display, displays a first portion of the second video from within the first predetermined portion of the predetermined FOV of the left side rear view camera;
      in response to a determination that both (a) a transmission of the vehicle is in reverse and (b) a steering wheel angle (SWA) is greater than a predetermined angle:
         on the right side display, displays a second portion of the first video from within a second predetermined portion of the predetermined FOV of the right side rear view camera, the second predetermined portion of the predetermined FOV being defined by a third predetermined horizontal AOV and a third predetermined vertical AOV,
      wherein at least one of:
         the third predetermined horizontal AOV is greater than the second predetermined horizontal AOV; and
         the third predetermined vertical AOV is greater than the second predetermined horizontal AOV; and
      on the left side display, displays a second portion of the second video from within the second predetermined portion of the predetermined FOV of the left side rear view camera.

2. The side rear view camera system of claim 1 wherein the display module further displays on the right and left side displays the second portion of the first and second videos, respectively, from within the second predetermined portion of the predetermined FOV for a merging event of the vehicle.

3. The side rear view camera system of claim 1 wherein the display module further displays on the right and left side displays the second portion of the first and second videos, respectively, from within the second predetermined portion of the predetermined FOV for a lane change event of the vehicle.

4. The side rear view camera system of claim 3 further comprising a lane change module that indicates the occurrence of the lane change event when a vehicle speed is greater than a predetermined speed and a driver has turned ON a turn indicator of the vehicle.

5. The side rear view camera system of claim 1 wherein both:
   the third predetermined horizontal AOV is greater than the second predetermined horizontal AOV; and
   the third predetermined vertical AOV is greater than the second predetermined vertical AOV.

6. The side rear view camera system of claim 1 wherein at least one of:
   the third predetermined horizontal AOV is less than the first predetermined horizontal AOV; and
   the third predetermined vertical AOV is less than the first predetermined vertical AOV.

7. The side rear view camera system of claim 1 wherein both:
- the third predetermined horizontal AOV is less than the first predetermined horizontal AOV; and
- the third predetermined vertical AOV is less than the first predetermined vertical AOV.

8. The side rear view camera system of claim 1 further comprising:
- a camera actuator module that selectively vertically tilts the right side rear view camera up to a predetermined position in response to a user input,
- wherein the first area is both to the right of and behind the vehicle, and
- wherein the right side display is located and visible within a passenger cabin of the vehicle.

9. The side rear view camera system of claim 1 further comprising:
- a camera actuator module that selectively vertically tilts the right side rear view camera down to a predetermined position in response to a user input,
- wherein the first area is both to the right of and behind the vehicle, and
- wherein the right side display is located and visible within a passenger cabin of the vehicle.

10. A method, comprising:
- receiving video from a right side rear view camera that captures first video of a first area at least one of to the right of and behind a vehicle, the right side rear view camera having a predetermined field of view (FOV), the predetermined FOV defined by a first predetermined horizontal angle of view (AOV) and a first predetermined vertical AOV;
- receiving video from a left side rear view camera that captures second video of a second area at least one of to the left of and behind the vehicle, the left side rear view camera having the predetermined FOV;
- displaying, on a right side display, a first portion of the first video from within a first predetermined portion of the predetermined FOV of the right side rear view camera, the first predetermined portion of the predetermined FOV being defined by a second predetermined horizontal AOV and a second predetermined vertical AOV;
- displaying, on a left side display, a first portion of the second video from within the first predetermined portion of the predetermined FOV of the left side rear view camera; and
- in response to a determination that both (a) a transmission of the vehicle is in reverse and (b) a steering wheel angle (SWA) is greater than a predetermined angle, displaying:
  - on the right side display, a second portion of the first video from within a second predetermined portion of the predetermined FOV of the right side rear view camera, the second predetermined portion of the predetermined FOV being defined by a third predetermined horizontal AOV and a third predetermined vertical AOV,
  - wherein at least one of:
    - the third predetermined horizontal AOV is greater than the second predetermined horizontal AOV; and
    - the third predetermined vertical AOV is greater than the second predetermined horizontal AOV; and
  - on the left side display, a second portion of the second video from within the second predetermined portion of the predetermined FOV of the left side rear view camera.

11. The method of claim 10 further comprising displaying on the right and left side displays the second portion of the first and second videos, respectively, from within the second predetermined portion of the predetermined FOV for a merging event of the vehicle.

12. The method of claim 10 further comprising displaying on the right and left side displays the second portion of the first and second videos, respectively, from within the second predetermined portion of the predetermined FOV for a lane change event of the vehicle.

13. The method of claim 12 further comprising identifying the occurrence of the lane change event when a vehicle speed is greater than a predetermined speed and a driver has turned ON a turn indicator of the vehicle.

14. The method of claim 10 wherein both:
- the third predetermined horizontal AOV is greater than the second predetermined horizontal AOV; and
- the third predetermined vertical AOV is greater than the second predetermined vertical AOV.

15. The method of claim 10 wherein at least one of:
- the third predetermined horizontal AOV is less than the first predetermined horizontal AOV; and
- the third predetermined vertical AOV is less than the first predetermined vertical AOV.

16. The method of claim 10 wherein both:
- the third predetermined horizontal AOV is less than the first predetermined horizontal AOV; and
- the third predetermined vertical AOV is less than the first predetermined vertical AOV.

17. The method of claim 10 further comprising selectively vertically tilting the right side rear view camera up to a predetermined position in response to a user input,
- wherein the first area is both to the right of beside and behind the vehicle, and
- wherein the right side display is located and visible within a passenger cabin of the vehicle.

18. The method of claim 10 further comprising selectively vertically tilting the right side rear view camera down to a predetermined position in response to a user input,
- wherein the first area is both to the right of and behind the vehicle, and
- wherein the right side display is located and visible within a passenger cabin of the vehicle.

* * * * *